United States Patent
Gehrke et al.

(10) Patent No.: US 7,372,374 B2
(45) Date of Patent: May 13, 2008

(54) MEASURING DEVICE USED IN PROCESS TECHNOLOGY, COMPRISING A CENTRAL POWER SUPPLY UNIT

(75) Inventors: Martin Gehrke, Weinstadt (DE); Stefan Beuel, Pliezhausen (DE)

(73) Assignee: Endress + Hauser Conducta Gesellschaft fur Mess- u. Regeltechnik mbH + Co. KG, Gerlingen (DE)

( * ) Notice: Subject to any disclaimer, the term of this patent is extended or adjusted under 35 U.S.C. 154(b) by 289 days.

(21) Appl. No.: 10/510,233

(22) PCT Filed: Apr. 11, 2003

(86) PCT No.: PCT/EP03/03759

§ 371 (c)(1),
(2), (4) Date: Sep. 21, 2005

(87) PCT Pub. No.: WO03/087964

PCT Pub. Date: Oct. 23, 2003

(65) Prior Publication Data

US 2006/0097893 A1 May 11, 2006

(30) Foreign Application Priority Data

Apr. 13, 2002 (DE) ............................. 102 16 330

(51) Int. Cl.
*H04Q 9/00* (2006.01)
(52) U.S. Cl. ................... 340/870.07; 340/870.01; 73/112; 702/1; 702/30; 702/127; 702/183

(58) Field of Classification Search ........... 340/870.07, 340/870.01; 375/224; 713/153; 710/305; 702/30, 183, 1, 127; 324/438; 73/112
See application file for complete search history.

(56) References Cited

FOREIGN PATENT DOCUMENTS

| DE | 19906627 A1 | 9/2000 |
|---|---|---|
| DE | 101 28829 A1 | 4/2002 |
| DE | 10059815 A1 | 6/2002 |
| DE | 101 24 800 A1 | 12/2002 |
| DE | 101 44971 A1 | 3/2003 |
| EP | 0 355 532 A2 | 2/1990 |
| EP | 0 355 532 A3 | 2/1990 |
| EP | 0716404 A1 | 6/1996 |
| EP | 1 180872 A1 | 2/2002 |
| EP | 1 249 747 A1 | 10/2002 |
| GB | 2 352 376 A | 1/2001 |
| WO | WO 03/067452 A1 | 8/2003 |

*Primary Examiner*—Davetta W. Goins
*Assistant Examiner*—Sisay Yacob
(74) *Attorney, Agent, or Firm*—Bacon & Thomas, PLLC

(57) ABSTRACT

A measuring device for process technology, having a central unit for the connection of different measurement modules, with the central unit containing a central power supply, to which the measurement modules can be connected. In the measurement module a module power supply is provided, which, from the central power supply, generates one or more supply voltage(s) ($V\_2$, $V\_3$) required by the measurement module. For this purpose, the module power supply has a transformer, a rectifier circuit, or also a switching power supply.

10 Claims, 2 Drawing Sheets

MEASURING DEVICE USED IN PROCESS TECHNOLOGY, COMPRISING A CENTRAL POWER SUPPLY UNIT

FIELD OF THE INVENTION

The present invention concerns a measuring device for process technology, having a central unit for the connection of different measurement modules, with the central unit containing a central power supply, to which the measurement modules can be connected.

The present invention also concerns an operating method for a measuring device for process technology, having a central unit for the connection of different measurement modules.

BACKGROUND OF THE INVENTION

Known measuring devices are often equipped with technically very complex power supplies, which must provide a number of different supply voltages.

In addition to the central unit itself, the measuring modules connectable with the central unit must also be fed from such power supply. These measuring modules have—depending on the purpose of application—a wide variety of sensor types, which oftentimes require special supply voltages.

Furthermore, the electrical power consumption of the measuring modules can be quite different, which is why it is not possible with conventional approaches to provide a power supply for a central unit, which has a good efficiency at all operating points.

SUMMARY OF THE INVENTION

Therefore, an object of the present invention is to provide an improved measuring unit for process technology, having a central power supply, and an operating method for such, wherein a wide variety of measurement modules are usable, while nevertheless preventing the cited disadvantages of the state of the art, and wherein the technical complexity of the circuitry in the central power supply is lessened, and the flexibility of the measuring unit is increased.

This object is achieved by the invention in a measuring device of the type named above in that, in the measurement module, a module power supply is provided, which generates one or more required supply voltage(s) from the central power supply.

A great advantage of the module supply is that the central power supply can be designed relatively simply, and, in particular, does not have to provide suitable supply voltages for every measuring module possibly connectable to, and powered by, the measuring device. The costs for such a measuring device are thus reduced, and its susceptibility to malfunction is lowered due to the significantly less complex construction of the central power supply.

In addition, there is the possibility of powering measurement modules without needing to consider their supply voltage requirements in the design of the central power supply.

The measuring device of the invention is provided especially for application in measuring- and/or cleaning- and/or calibration installations, as well as in the area of process automation, for measuring pH-values and/or redox-potentials, and/or other process parameters.

In an especially advantageous embodiment of the present invention, the central power supply can provide an alternating voltage, from which the connected measurement modules generate the required supply voltages with the help of their respective module power supplies.

A very simple variant of a module power supply provides a transformer and, if necessary, a rectifier circuit in the module power supply, such that direct and alternating voltages can be generated in the measurement module.

The rectifier circuit can include, for example, a conventional bridge rectifier and filter networks, as well as a voltage converter, if necessary. As a practical feature, the module power supply possesses a separate fuse, so that an error condition in a measurement module cannot disrupt the entire central power supply.

The required voltage in the measurement module can be set by selecting the transformation, or turns, ratio of the transformer, whereby, in principle, the generation of a smaller, as well as a larger, secondary voltage in comparison with the voltage of the central power supply is possible.

A transformation ratio with the value one is also possible, this meaning, then, simply a galvanic separation between the central power supply and the measurement module, or its module power supply.

It is also possible to provide only a rectifier circuit without transformer in the module power supply, in which case there is no galvanic separation of the measurement module from the central power supply.

The frequency of the supply voltage provided by the central power supply can, for example, amount to 50 Hz, with the supply voltage possibly being obtained directly from a public power grid.

Quite advantageously, supply voltages of higher frequency can also be used, in order to allow, at equal supply power, smaller dimensions for possibly present transformers.

A further advantageous form of embodiment of the measuring device of the invention provides that the central power supply can furnish a direct voltage. This is especially practical when measurement modules include microprocessors or other integrated electronic components requiring a common supply voltage of e.g. 5 volts.

In accordance with a further form of embodiment of the invention, the module power supply has a switching power supply. Because of their generally high efficiency, switching power supplies are especially well-suited, particularly, for supplying applications with high power consumption.

Furthermore, switching power supplies have a very broad input voltage range, such that, in the central power supply, no great technical complexity of the circuitry is necessary for generating the supply voltage to ensure the operation of a measurement module with a switching power supply in the module power supply.

For use in measurement modules having sensors of high sensitivity, a shield for the switching power supply is provided, in order to reduce interference radiation. If necessary, the operating frequency of the switching power supply can be set distinctly above the limit frequency of measurement signals, or a filter network for the measurement signals can be provided.

For use in explosion prevention, it is provided in another form of embodiment of the invention that the central power supply has a first induction-apparatus, and that the module power supply has a second induction-apparatus. Since the electrical energy transfer in this variant of the invention is achieved according to the principle of induction, no electrical contacts must be actuated in order to connect the measurement module to the central power supply. The risk of spark formation when contact is interrupted is thereby ruled out.

In this form of embodiment, it makes especially good sense to have a small separation between the first and the second induction apparatuses, this being achieved using appropriately-meshing housing sections of the central unit and measurement module.

Also very advantageous is a variant of the invention in which the voltage provided by the central power supply can be modulated with an information signal, in order to enable communication of data between the central unit and the measurement module, without needing to provide separate transfer lines for such. When designing such a system, the band width of the information signal must be selected taking into account the transfer function of the transformer.

A further very advantageous form of embodiment of the invention is characterized in that, in the measurement module, a feedback unit is provided, which generates a feedback signal from the supply voltage being applied to the measurement module, which signal can be fed to a regulator of the central power supply for influencing the supply voltage.

In a very simple variant, the feedback unit includes, for example, a voltage divider, or other circuit, for producing the feedback signal, constructed such that the feedback signal matches a reference voltage of the regulator when the supply voltage generated by the central unit matches the voltage required by the measurement module.

Various measurement modules with different supply voltage requirements can, in this variant, be equipped with voltage dividers of different characteristics in order to transform the respective supply voltages into the reference voltage of the regulator.

When a deviation of the feedback signal from the reference voltage yields a control difference, the supply voltage can be readjusted using the control difference.

The object of the present invention is further achieved by providing an operating method for a measuring device for process technology, having a central unit for the connection of different measurement modules, in which device the central unit includes a central power supply, to which the measurement modules can be connected, and in which a module power supply is provided in the measurement module, wherein one or more supply voltage(s) required by the measurement module is (are) generated by the module supply from the central power supply.

In this connection, it is especially advantageous when the voltage provided by the central power supply is modulated with an information signal.

An advantageous variant of the operating method of the invention is characterized in that the supply voltage(s) is (are) changed during operation. This can be accomplished, for example, in that a measurement module connects a second transformer, provided in its module power supply, with the central power supply, or also in that control factors of a switching power supply are changed.

The second transformer can be, for example, a transformer with a large power output that is used only occasionally. Switching off the second transformer during operation helps to keep the burden on the central power supply as small as possible.

In general, the function of the measurement module is not limited to registering measured values. A measurement module can also include calculation units, output units, or other data processing devices, or devices which enable an enhancement of the measuring device.

Further features, possibilities of application and advantages of the invention will follow from the subsequent description of examples of embodiments of the invention illustrated in the figures of the drawing. In this connection, all described or illustrated features, whether alone or in any combination, form the subject matter of the invention, independently of their summarization in the patent claims or the examples in which they were presented, as well as independently of their formulation, respectively illustration, in the description, respectively in the drawing.

DESCRIPTION OF THE PREFERRED EMBODIMENTS

Figure 1:
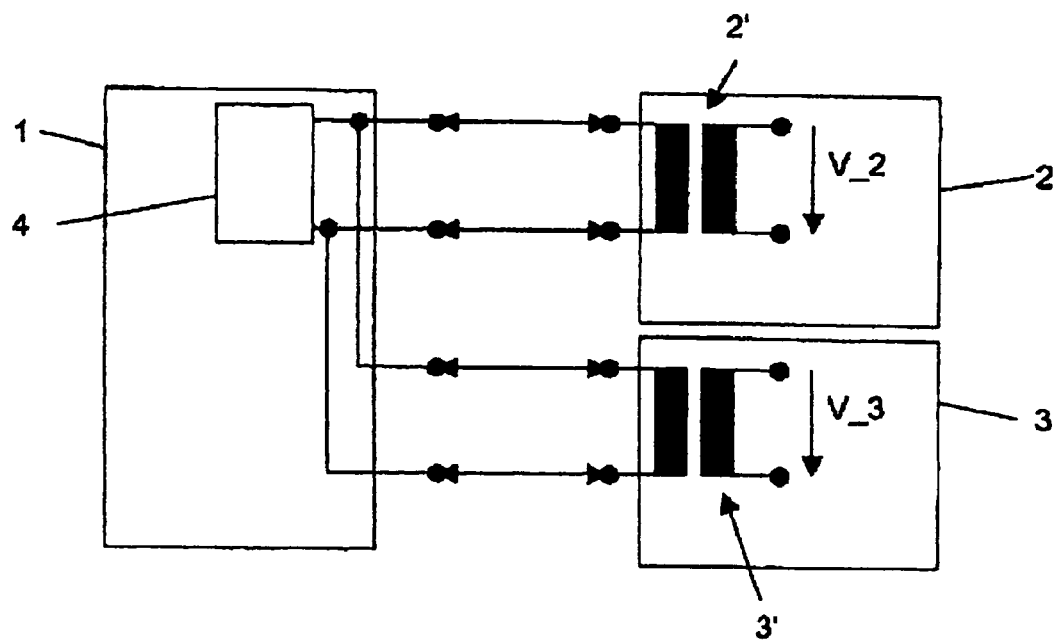
FIG. 1 shows a first form of embodiment of the measuring device of the invention.

In the form of embodiment of the measuring device of the invention shown in FIG. 1, a central unit 1, as well as two measurement modules 2, 3 are shown.

The central unit 1 has a central power supply 4, which serves to supply the measurement modules 2, 3 with electrical power.

The central power supply 4 is composed of, for example, a power transformer, which, if necessary, is protected with a self-healing overload-protector or a melt-type fuse, and supplies an alternating voltage with a frequency of 50 Hz.

The measurement module 2 has a module power supply 2', and the measurement module 3 a module power supply 3'. The module supplies 2', 3' are connected with the central power supply 4, and convert the alternating voltage furnished by the central power supply 4 into the supply voltages $V\_2$, $V\_3$ required by the measurement modules 2, 3.

For this purpose, the module supply 2' includes a transformer which is directly connected with the central power supply 4. The transformer has a transformation ratio of one to two, i.e. the supply voltage $V\_2$ on the secondary side of the transformer is twice as high as the alternating voltage furnished by the central power supply 4 to the primary side of the transformer.

It is possible to adjust the level of the supply voltage $V\_2$ by selecting a different transformation ratio for the transformer. In the case where only a galvanic separation of the measurement module 2, or module supply 2', and the central power supply 4 is desired, a transformer with a transformation ratio of one can be used.

Since the measuring device is, in principle, suitable not only for measurements but also for controlling and/or regulating processes, a measurement module can also have actors, or actuators.

The measurement module 2 illustrated in FIG. 1 thus has a heating element (not shown), as an example of an actor. The heating element is powered directly by the supply voltage $V\_2$ of the module supply 2'.

A microprocessor, also arranged in the measurement module 2, requires as supply voltage a stabilized direct voltage of five volts, which is obtained from the supply voltage $V\_2$ with the help of a rectifier circuit and additional components. It is especially favorable to use a voltage converter, or voltage regulator, for generating/stabilizing the direct voltage. Alternatively, the central power supply 4 can also provide the stabilized direct voltage frequently required for integrated circuits.

The measurement module 3 requires a supply voltage V_3 different from the supply voltage V_2 of the measurement module 2. Therefore, the module supply 3' has a transformer with a different transformation ratio. On the primary side, however, this transformer is connected in parallel to the transformer of the module supply 2', such that the same alternating voltage is applied to both transformers on the primary sides.

Furthermore, the module supply 3' has additionally an auxiliary transformer (not shown), which, in special process steps, and controlled by the measurement module 3, is connected with the central power supply 4. Thus, the auxiliary transformer is active only when it is required, whereby unnecessary power loss in the measurement module 3 is prevented.

In place of a transformer, it is also possible to install a switching power supply in the module power supply 2', 3', which, because of its broad input voltage range, places minimal constraints on the voltage furnished by the central power supply 4. The high efficiency and small size are further advantages of using a switching power supply in measurement modules 2, 3. To prevent excessive interference radiation, the module power supply 2', 3' can be appropriately shielded.

In accordance with the modular construction of the measuring device, it is possible to connect further measurement modules, in addition to measurement modules 2, 3, to the central unit 1. Since the supply voltage required by a measurement module is, in accordance with the invention, furnished by the module power supply, the supply voltage requirements of additional measurement modules need not be taken into consideration during the fabrication, respectively installation, of a measuring device.

During the design of the measuring device, with respect to the central power supply, only the maximum electrical power, which must be furnished by the central power supply 4, needs to be taken into consideration.

Figure 2:
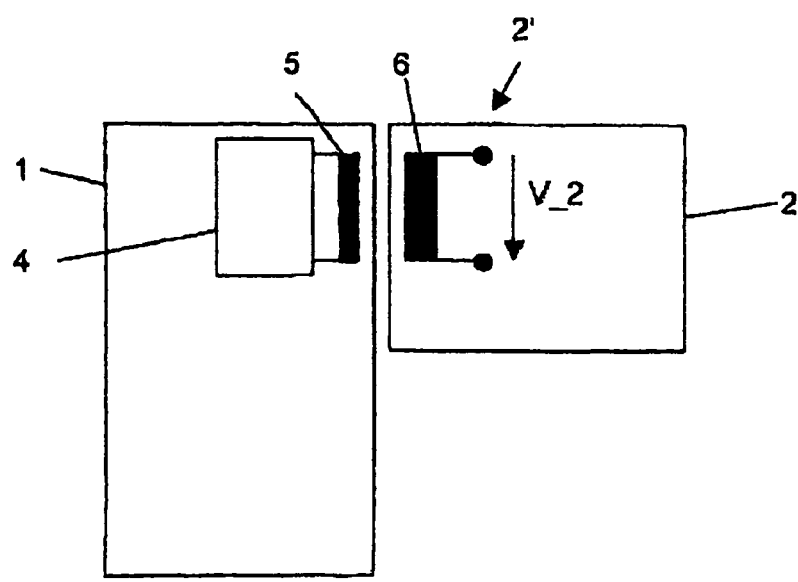
FIG. 2 shows a second form of embodiment of the measuring device of the invention.

The form of embodiment of the invention illustrated in FIG. 2 has a central unit 1 and a measurement module 2. The central power supply 4 of the central unit 1 has a first induction apparatus 5, which can interact with a second induction apparatus 6. The second induction apparatus 6 is part of the module power supply 2' of the measurement module 2.

With a sufficiently small separation between the induction apparatuses 5, 6, a useable electrical power transfer between the central power supply 4 and the module power supply 2', or measurement module 2, is possible.

This power transfer of the invention also permits operation of the measuring device in environments where there is danger of explosion, since, in principle, no spark formation, as e.g. can happen in the case of separating electrical contacts, is possible here.

The housings of the central unit 1, respectively measurement module 2, are, in accordance with the type of protection class required by law, gas-tightly encapsulated, and, advantageously, have meshing housing-sections in the area of the induction apparatuses 5, 6, in order to permit an especially close arrangement of the induction apparatuses 5, 6 relative to one another.

In a further, very advantageous form of embodiment, which is also suitable for use in environments where there is danger of explosion, circuits of the central unit 1 and/or measurement module 2 are constructed to be intrinsically safe, as so-called "Ex-i" circuits. In this case, no gas-tight housing is necessary.

It is also very advantageous to modulate the voltage furnished by the central power supply 4 with an information signal. A data communication between the central unit 1 and a measurement module 2, 3 can thereby be implemented without needing to provide additional lines for transferring the information signal. It is even possible, depending on the protocol used for the data communication, to establish a bidirectional communication between the central unit 1 and the measurement modules 2, 3 without additional physical measures.

Figure 3:
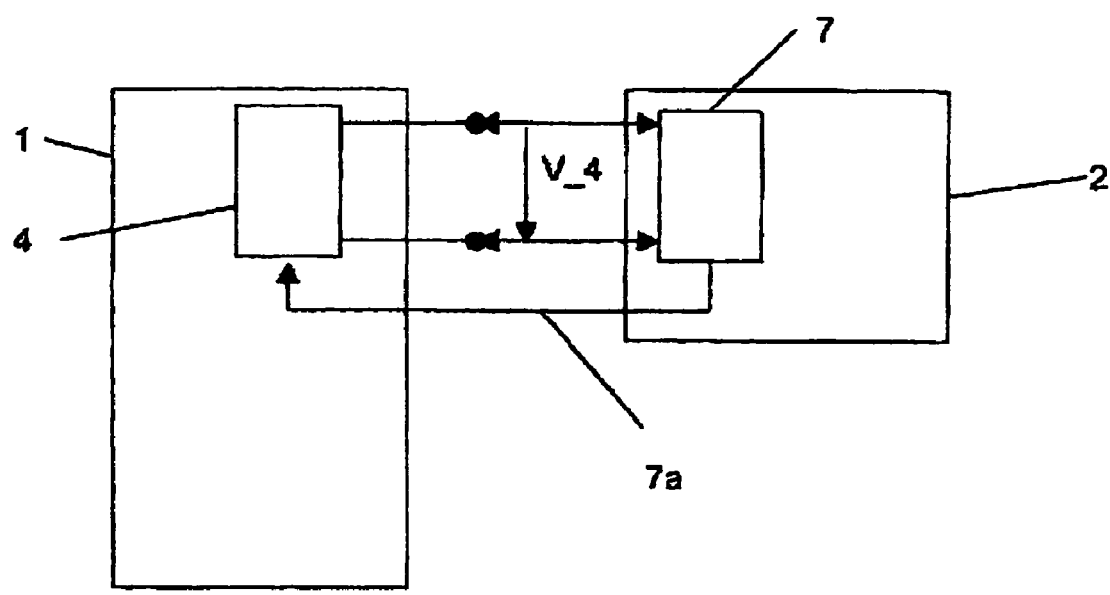
FIG. 3 shows a third form of embodiment of the measuring device of the invention.

The form of embodiment of the invention illustrated in FIG. 3 is characterized in that, in the measurement module 2, a feedback unit 7 is provided, which, from the supply voltage V_4 applied to the measurement module 2, generates a feedback signal 7a, which can be fed to a regulator (not shown) of the central power supply 4, and influences the supply voltage V_4, or influences the generation of such in the regulator of the central power supply 4.

For this purpose, the feedback unit 7 includes a voltage divider (not shown), which generates the feedback signal 7a. The regulator of the central power supply 4 has a reference voltage source (not shown), whose reference signal is compared with the feedback signal 7a. For this purpose, the voltage divider is constructed such that, when the supply voltage V_4 generated by the central power supply 4 matches the voltage required by the measurement module 2, the feedback signal 7a matches the reference signal of the regulator.

If the supply voltage V_4 generated by the regulator of the central power supply 4 should deviate from the supply voltage required by the measurement module 2, then, from the non-vanishing difference of the reference voltage and the feedback signal 7a, a control difference results, which is used for adjusting the generated supply voltage V_4.

Depending on supply voltage requirements, the voltage divider is designed differently for different measurement modules 2, with e.g. in each case only one element of the voltage divider being different from that in measurement module 2, depending on supply voltage requirements.

As an alternative to generating the feedback signal 7a from the supply voltage V_4, a different means of generating the feedback signal is possible, for example as a function of a current flowing into the measurement module 2.

The invention claimed is:

1. A measuring device for use in process technology, having:
   a plurality of measurement modules;
   a central unit for the connection of different ones of said measurement modules, said central unit containing a central power supply, to which said measurement modules can be connected, wherein:
   in said measurement module a module power supply is provided, which generates from said central power supply one or more supply voltage(s) (V_2, V_3) required by said measurement module; and
   in said measurement module, a feedback unit is provided, which, from the supply voltage (V_4) applied to said measurement module, generates a feedback signal, which can be fed to a regulator of the central power supply, and influences the supply voltage (V_4).

2. The measuring device as claimed in claim 1, wherein: said central power supply can furnish an alternating voltage.

3. The measuring device as claimed in claim 1, wherein: said central power supply can furnish a direct voltage.

4. The measuring device as claimed in claim 1, wherein: said module power supply includes a transformer.

5. The measuring device as claimed in claim 1, wherein: said module power supply includes a switching power supply.

6. The measuring device as claimed in claim 1, wherein: said central power supply includes a first induction apparatus, and said module power supply includes a second induction apparatus.

7. The measuring device as claimed in claim 1, wherein: the voltage furnished by the central power supply can be modulated with an information signal.

8. The measuring device as claimed in claim 1, wherein: the measuring device is used in measuring- and/or cleaning- and/or calibration installations, especially also in the field of process automation, for measuring pH-values and/or redox-potentials and/or other process parameters.

9. The operating method as claimed in claim 1, wherein: the voltage furnished by the central power supply is modulated with an information signal.

10. The operating method as claimed in claim 1, wherein: the supply voltage(s) ($V\_2$, $V\_3$) is (are) changed during operation.

* * * * *